US007608938B2

(12) United States Patent
Andrew et al.

(10) Patent No.: US 7,608,938 B2
(45) Date of Patent: Oct. 27, 2009

(54) METHODS AND APPARATUS FOR ELECTRIC POWER GRID FREQUENCY STABILIZATION

(75) Inventors: Philip Lynn Andrew, Simpsonville, SC (US); Timothy Andrew Melsert, Ballston Lake, NY (US); John Edward Ford, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 638 days.

(21) Appl. No.: 11/548,917

(22) Filed: Oct. 12, 2006

(65) Prior Publication Data

US 2008/0095294 A1    Apr. 24, 2008

(51) Int. Cl.
    *H02P 9/04*    (2006.01)
(52) U.S. Cl. .............................. 290/52; 290/2; 290/4 R
(58) Field of Classification Search ................. 290/1 A, 290/2, 4 R, 52; 60/39, 182
    See application file for complete search history.

(56) References Cited

U.S. PATENT DOCUMENTS

| 4,031,372 | A | 6/1977 | Davis |
| 4,094,148 | A | 6/1978 | Nelson |
| 6,182,439 | B1 | 2/2001 | Siga et al. |
| 6,546,713 | B1 | 4/2003 | Hidaka et al. |
| 6,609,361 | B2 | 8/2003 | Vugdelija |
| 6,766,646 | B1 * | 7/2004 | Ford et al. ..................... 60/646 |
| 6,810,675 | B2 | 11/2004 | Liebig |
| 6,945,030 | B2 | 9/2005 | Hirayama |
| 6,957,540 | B1 | 10/2005 | Briesch et al. |
| 7,076,940 | B2 | 7/2006 | Hirayama et al. |
| 7,274,111 | B2 * | 9/2007 | Andrew et al. ................ 290/52 |
| 7,353,654 | B2 * | 4/2008 | Bolis et al. ..................... 60/775 |
| 7,353,655 | B2 * | 4/2008 | Bolis et al. ..................... 60/775 |
| 7,353,656 | B2 * | 4/2008 | Bolis et al. ..................... 60/775 |
| 7,355,297 | B2 * | 4/2008 | Andrew et al. ................ 290/52 |
| 2004/0060299 | A1 | 4/2004 | Liebig |

FOREIGN PATENT DOCUMENTS

| DE | 101 24 494 A1 | 11/2002 |
| EP | 1 275 822 A2 | 1/2003 |

OTHER PUBLICATIONS

EP Search Report, Application No. EP07254051 (Mar. 3, 2008).

* cited by examiner

*Primary Examiner*—Nicholas Ponomarenko
(74) *Attorney, Agent, or Firm*—Armstrong Teasdale LLP

(57) ABSTRACT

Methods and apparatus for operating a combined-cycle power system are provided. The method includes operating the steam turbine, the combustion turbine, and the steam source at steady state operating conditions. Upon sensing a grid frequency deviation away from the standardized grid frequency value, determining a current thermal energy capacity of the steam source, determining a rate of frequency recovery available using the current thermal energy capacity of the steam source and a predetermined rate of change of the at least one steam turbine control valve, if the determined rate of frequency recovery available is greater than the grid frequency deviation, mitigating the frequency deviation using the current thermal energy capacity, if the determined rate of frequency recovery available is less than the grid frequency deviation then mitigating the frequency deviation using the current thermal energy capacity substantially simultaneously with a power level increase of the combustion turbine.

20 Claims, 3 Drawing Sheets

METHODS AND APPARATUS FOR ELECTRIC POWER GRID FREQUENCY STABILIZATION

BACKGROUND OF THE INVENTION

This invention relates generally to electric power grids and more particularly, to methods and apparatus for operating combined-cycle power systems coupled to electric power grids.

The term "full load" is used herein interchangeably with "rated output" and "maximum continuous rating" (MCR). These terms refer to an upper range of continuous operation output for the power system and its associated components. "Partial load" refers to an output level below full load.

Electric power grids typically include a number of power generating systems to supply electricity to the grid and a number of electricity consumers that draw electricity from the grid. When the generation and consumption of electricity are substantially equal, the grid frequency is substantially constant. Grid frequency is normally a parameter maintained at a substantially stable value. Examples of nominal standard grid frequencies for the European and North American systems are 50 Hz and 60 Hz, respectively.

Frequency deviations of a transient nature may result from increased or decreased consumption and/or removal or addition of power generation systems. Increased consumption and removal of power generation systems tends to cause a decrease of the grid frequency. Decreased consumption and addition of power generation systems tends to cause an increase of the grid frequency. Power consumption and power generation are time-dependent variables which may cause frequency variations in a range of approximately +0.5 Hz to −0.5 Hz. Generally, frequency transients are of a short duration, i.e., measured in seconds to minutes, and as discussed above, small magnitudes. The magnitude of a frequency transient is typically influenced by a ratio of the magnitude of a power variation to the total power level within the grid and associated interconnected grids throughout the duration of the variation. The aforementioned small magnitude frequency transients are consistent with the small size of a typical power variation as compared to the typically large size of nominal interconnected grids. Also, in general, power grids tend to be self-correcting with respect to maintaining grid frequency within a substantially constant range. For example, in the event of a frequency deviation from a standard value, a near-term variation in power generation spread over a number of power generator systems may be facilitated by at least one control system and at least one control strategy to mitigate the magnitude and the duration of the frequency transient such that frequency transients normally do not impact consumers.

Larger frequency transients such as transients outside the range of approximately +0.5 Hz to −0.5 Hz and due, for example, to a frequency decrease as a result of an immediate loss of one or more power generators, sometimes referred to as a trip, may tend to induce a large frequency decrease. One possible method to mitigate the frequency transient magnitude and duration is to have some amount of standby power generation capacity, sometimes referred to as system reserve, available within the grid to respond to the frequency decrease within seconds of the transient. For example, a particular generating unit on the grid may be induced to initiate a fast increase in its associated power generation output to the grid.

Many known power generation facilities include either steam turbine generators (STG), combustion turbine generators (CTG), or some combination thereof. These configurations typically include a turbine rotatably coupled to an associated electric generator. The generator frequency is normally synchronized to the electric power grid frequency and rotates at a speed substantially similar to the grid frequency.

Many known STGs operate in flow communication with a steam generation apparatus, for example, a boiler. Generally, air and fuel are combusted to release thermal energy that is subsequently used to boil water to generate steam. The steam generated is channeled to a turbine wherein the thermal energy of the steam is converted to mechanical energy to rotate the rotor of the turbine. The power generated is proportional to the rate of steam flow to the turbine.

One known method of maintaining a power reserve is to operate a STG with at least one associated steam supply control valve in a partially open, or throttled, position such that the steam generator, the STG and the power grid are in an equilibrium, sometimes referred to as a steady-state condition, operating at some value less than full rated load of the steam generator and STG arrangement. The difference between full load and partial load is often referred to as spinning reserve. A controller is utilized to sense a decrease in system frequency and to generate a control signal transmitted to the steam valve within seconds of sensing a frequency transient. The control signal causes the valve to move to a more open position and thermal energy stored within the components of the steam generation apparatus, for example, the superheater, begins to be removed immediately via increased steam flow through the steam generator. Cooling fluid, air and fuel are subsequently increased over time to facilitate establishing a modified equilibrium between the steam generator, the STG and the power grid. However, many steam generator and STG combinations may take two to five minutes to attain the modified equilibrium while operating within predetermined parameters to mitigate the potential for increased stress and wear on affected components. Also, the amount of thermal energy typically stored in the aforementioned manner is limited. In addition, many steam generator and STG combinations may not effectively respond to a grid frequency transient with a stable, controlled response. For example, the aforementioned steam valve to the STG may open too quickly and deplete the thermal energy reserve too rapidly to deliver a sustained, effective response. Alternatively, the steam valve to the STG may open too slowly to deliver a timely, effective response.

Many known CTGs ignite a fuel-air mixture in a combustor assembly and generate a combustion gas stream that is channeled to a turbine assembly via a hot gas path. Compressed air is channeled to the combustor assembly by a compressor assembly that is normally coupled to the turbine, i.e., the compressor, turbine and generator rotate at the same speed. The power generated is proportional to the rate of combustion gas flow to the turbine and the temperature of the gas flow stream. Typically, many known CTGs have an operationally more dynamic behavior than STG (and their associated steam sources), therefore, CTGs may respond to system transients more rapidly.

One known method of maintaining a power reserve is to operate a CTG with at least one associated air guide vane and at least one fuel supply valve in a partially open, or throttled, position such that the CTG and the power grid are in an equilibrium, operating at some value less than the full rated load of the CTG. As discussed above for the STG, the difference between full load and the partial load is often referred to as spinning reserve. A controller senses a decrease in grid frequency and generates a signal that causes the air inlet guide vane and the fuel supply valve to open further within seconds of sensing the frequency transient. Since the compressor, the turbine and the generator are coupled to the same shaft, and since the generator that is synchronized to the grid decelerates as grid frequency is decreased, there exists an initial bias to channel less air into the CTG. This condition initiates a decreasing bias in CTG electric power generation that may negatively impact subsequent activities to increase CTG electric power generation. Furthermore, a bias to decrease air flow followed by a bias to increase air flow through the associated compressor may introduce a potential for a compressor surge, i.e., a substantially uncontrolled fluctuation of air flow and compressor discharge pressure, with surge potential being more pronounced at the lower end of compressor rated air flows. As the vane opens to increase the air flow and as the valve opens to increase the fuel flow, the mass flow rate of the combustion gas and the combustion gas temperature begin to increase within seconds of sensing the system frequency transient. Air and fuel are subsequently increased over time to facilitate establishing a modified equilibrium between the CTG and the power grid. In order to overcome the initial bias to decrease generation and then to accelerate the CTG, the combustion turbine may need to peak-fire, i.e., rapidly increase the rate of combustion to rapidly increase gas stream temperature while the subsequent increase of air flow follows. While the CTG may exhibit a more dynamic ability to respond to a frequency transient, many known CTGs may have temperature and temperature gradient limitations that may extend the time duration for increasing gas stream temperatures in order to mitigate stresses on a portion of the materials associated with the CTG. Otherwise, component stresses may increase and their associated life span may be negatively affected.

Many known steam generation apparatus and CTG are thermally most efficient operating in a range near the upper end of their operational power generation range. Maintaining a power generation level below that range may decrease thermal efficiency with a subsequent increase in cost of operation as well as possibly deny the owners of the facility potential revenue from the sale of the electric power held in reserve and routinely not generated.

Many known combined-cycle electric power generation facilities typically include at least one CTG and at least one STG. Some known configurations for such facilities include channeling the combustion gas exhaust from a CTG to a heat recovery steam generator (HRSG), wherein the thermal energy from the combustion gas exhaust boils water into steam, the steam subsequently being channeled to a STG. Typically, combined-cycle facilities are configured to use a CTG as the primary response mechanism for grid frequency transients while a STG is maintained as the secondary response. While this physical configuration offers benefits of efficiency and therefore economy of operation, the response configuration and method includes at least some of the aforementioned challenges in responding rapidly and effectively to a grid frequency transient.

BRIEF DESCRIPTION OF THE INVENTION

In one embodiment, a method of operating a combined-cycle power system coupled to an electric power grid is provided. The combined-cycle system includes at least one electric power generator, a steam turbine coupled to the at least one electric power generator, a combustion turbine coupled to the at least one electric power generator, and a steam source having a thermal energy reservoir, the thermal energy reservoir being in flow communication with the steam turbine via at least one control valve. The method includes operating the steam turbine at a first electric power output, operating the combustion turbine at a first electric power output, and operating the steam source at a first thermal energy level, the steam turbine having at least one control valve in a first position, the combustion turbine having at least one air inlet guide vane in a first position. The steam turbine and the combustion turbine are synchronized to an operating frequency of the grid, so that the steam turbine, the combustion turbine, and the grid are operating at a frequency substantially similar to a standardized grid frequency value. Upon sensing a grid frequency deviation away from the standardized grid frequency value the system determines a current thermal energy capacity of the thermal energy reservoir, and determines a rate of frequency recovery available using the current thermal energy capacity of the thermal energy reservoir and a predetermined rate of change of the at least one steam turbine control valve. If the determined rate of frequency recovery available is greater than the grid frequency deviation and a predetermined recovery period then, moving the at least one steam turbine control valve to a second position thereby facilitating a predetermined rate of a grid frequency recovery for a predetermined period of time, the predetermined rate of frequency recovery being substantially uniform. If the determined rate of frequency recovery available is less than the grid frequency deviation and a predetermined recovery period then, substantially simultaneously moving the at least one combustion turbine air inlet guide vane to a second position and the at least one steam turbine control valve to a second position thereby facilitating a predetermined rate of a grid frequency recovery for a predetermined period of time, the predetermined rate of frequency recovery being substantially uniform.

In another embodiment, an electric power grid frequency control sub-system for a combined-cycle power system includes a steam turbine comprising a steam flow control valve, a steam source coupled in flow communication with said steam turbine through said control valve, said steam source comprising a thermal energy reservoir, a combustion turbine comprising an inlet guide vane, an electric power generator coupled to at least one of said steam turbine and said combustion turbine, said electric power generator electrically coupled to an electric power grid, a frequency of said generator and the grid being synchronized at an operating frequency of the grid, and a controller configured to modulate said steam flow control valve and said inlet guide vane substantially simultaneously to facilitate inducing a predetermined rate of a grid frequency recovery for a predetermined period of time wherein the predetermined rate of frequency recovery is substantially uniform.

In yet another embodiment, a combined-cycle power system includes a steam turbine comprising a steam flow control valve, said steam turbine coupled to at least one electric generator, a steam source comprising a thermal energy reservoir, said steam source in flow communication with said steam turbine through said steam flow control valve, a combustion turbine coupled to the at least one electric generator said combustion turbine comprising an inlet guide vane, and a controller communicatively coupled to said steam flow control valve, said steam source, and said inlet guide vane. The controller is configured to determine a current thermal energy capacity of the thermal energy reservoir, determine a rate of frequency recovery available using the current thermal energy capacity of the thermal energy reservoir and a predetermined rate of change of the steam turbine control valve, open the inlet guide vane substantially simultaneously with said steam flow control valve in response to a grid under-frequency condition that exceeds the frequency recovery available of the thermal energy reservoir, and close the inlet guide vane substantially simultaneously with said steam flow control valve in response to a grid over-frequency condition that exceeds the frequency recovery available of the thermal energy reservoir.

DETAILED DESCRIPTION OF THE INVENTION

Figure 1:
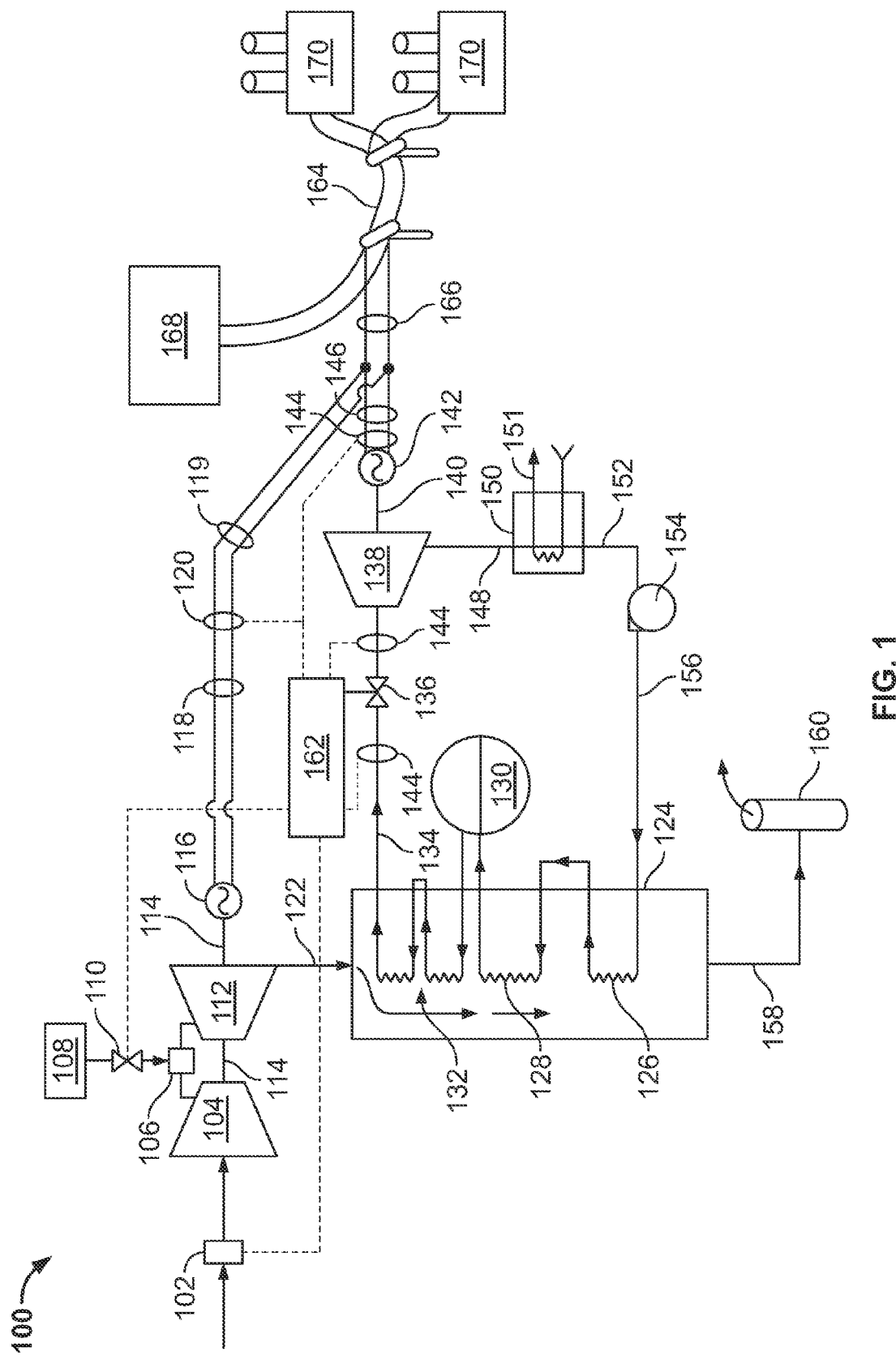
FIG. 1 is a schematic view of an exemplary steam turbine-generator system in accordance with an embodiment of the present invention.

FIG. 1 is a schematic illustration of an exemplary combined-cycle power generation system 100. System 100 includes at least one combustion turbine air inlet guide vane 102, a combustion turbine compressor 104 that is in flow communication with at least one combustor 106, a fuel storage facility 108 also in flow communication with combustor 106 via at least one fuel supply valve 110, a combustion turbine 112, a common shaft 114, a combustion turbine generator (CTG) 116 that is rotatably coupled to compressor 104 and turbine 112 via shaft 114, a generator output connection 118, a plurality of CTG sensors 120, and a combustion turbine exhaust gas duct 122 in flow communication with a heat recovery steam generator (HRSG) 124. HRSG 124 includes a first set of tube banks 126, a second set of tube banks 128, a steam drum 130, and a third set of tube banks 132 with tube banks 126, 128, 132 and drum 130 in flow communication with each other. System 100 further includes a superheated steam header 134 in flow communication with a steam turbine 138 via at least one steam turbine control valve 136. A common shaft 140 rotatably couples turbine 138 to a steam turbine generator (STG) 142. System 100 further includes a plurality of STG sensors 144 and a generator output connection 146. Furthermore, a steam turbine steam exhaust duct 148, a condenser 150, a cooling fluid tube bundle 151 with cooling water flow, a condensate supply header 152, a condensate/feedwater pump 154, and a feedwater supply header 156 are in flow communication with each other. A HRSG gas exhaust duct 158 is in flow communication with HRSG 124 and a stack 160. Automated and manual control of system 100 is facilitated with a controller 162. Generators 116 and 142 are interconnected with an electric power grid 164 via transmission lines 166. Consumers 168 are connected to grid 164 as are other power generation facilities 170.

Electric power is generated by CTG 116. Compressor 104 channels air to combustor 106 through air inlet guide vane 102. Alternatively, a plurality of fast-acting guide vanes may be used. Fuel is channeled to combustor 106 from storage facility 108 via fuel valve 110. In the exemplary embodiment storage facility 108 is a natural gas supply station. Alternatively, facility 108 may be a natural gas storage tank, a fuel oil storage tank or a fuel oil trailer. Also, alternatively, system 100 may include an Integrated Gasification Combined Cycle (IGCC) plant wherein facility 108 generates a synthetic gas. Combustor 106 ignites and combusts the fuel with the air to generate high temperature, i.e., approximately 1316° Celsius (C.) (2400° Fahrenheit (F.)), combustion gas that is subsequently channeled to turbine 112. In the exemplary embodiment, turbine 112 is a multi-fuel unit wherein combustor 106 may ignite and combust, for example, natural gas, fuel oil, or other fuels. Thermal energy in the combustion gas is converted to rotational energy in turbine 112. As described above, turbine 112 is rotatably coupled to compressor 104 and generator 116 via shaft 114, and compressor 104 and generator 116 rotate with turbine 112 with substantially similar rotational velocities. Generator 116 generates a voltage and an electric current at a frequency directly proportional to shaft 114 rotational velocities when generator 116 is not synchronized to grid 164. The electric power output of generator 116 is transmitted to grid 164 via interconnection 118 at a frequency substantially similar to grid 164 frequencies when generator 116 is synchronized to grid 164. Generator 116 may be controlled via an excitation system (not shown in FIG. 1). Plurality of sensors 120 may include at least one current transducer (not shown in FIG. 1), one voltage transducer (not shown in FIG. 1) and one frequency transducer (not shown in FIG. 1). The outputs of sensors 120 are transmitted to controller 162.

Electric power is also generated with STG 142. HRSG 124 transmits superheated steam to turbine 138 via steam header 134 and control valve 136. Control valve 136 is continuously biased via controller 162 to modulate steam flow to turbine 138 as discussed further below. Controller 162 receives input from sensors 144. In the exemplary embodiment, sensors 144 include pressure transducers immediately upstream and downstream of valve 136. Thermal energy in the steam is converted to mechanical energy in turbine 138 that rotates shaft 140. As described above, turbine 138 is rotatably coupled to generator 142 via shaft 140, and STG 142 rotates with turbine 138 with substantially similar rotational velocities. Generator 142 generates a voltage and an electric current at a frequency directly proportional to shaft 140 rotational velocities when generator 142 is not synchronized to grid 164. The electric power output of generator 142 is transmitted to grid 164 via interconnection 146 at a frequency substantial similar to grid 164 frequency when generator 142 is synchronized to grid 164. Generator 142 may be controlled via an excitation system (not shown in FIG. 1). Plurality of sensors 144 may include at least one current transducer (not shown in FIG. 1), one voltage transducer (not shown in FIG. 1) and one frequency transducer (not shown in FIG. 1). The outputs of sensors 144 are transmitted to controller 162.

Alternatively, a steam turbine assembly that includes a variety of configurations may be used. For example, a steam turbine assembly may include a high pressure section, an intermediate pressure section, and a low pressure section. Also, for another example, a steam turbine assembly and a combustion turbine assembly may be rotatably coupled to a single shaft rotatably driving a single generator.

Steam for turbine 138 is generated via HRSG 124. Alternatively, HRSG 124 may be replaced by an independently-fired boiler apparatus. In the exemplary embodiment, HRSG 124 receives exhaust gases from turbine 112 via duct 122. Generally, gas exhaust from combustion turbines includes usable thermal energy, with a temperature range of approximately 538° C. to 649° C. (1000° F. to 1200° F.), that is not converted to mechanical energy within turbine 112 to rotate shaft 114. Exhaust gases flow through HRSG 124 from the higher temperature steam generating components, illustrated in the exemplary embodiment as superheater tube banks 132, to the lower temperature tube banks 128 firstly, and then tube banks 126. Gas is channeled to duct 158 and subsequently to stack 160, generally via environmental control sub-systems (not shown in FIG. 1), that channels the gases to the environment. Generally, substantially little usable thermal energy remains in the gas stream upon exhaust to the environment.

Water is boiled to generate steam in HRSG 124. Sub-cooled water is stored in condenser 150. In the exemplary embodiment, condenser 150 includes a main condenser that receives steam from turbine 138 via duct 148. Condenser 150 also includes a cavity (not shown in FIG. 1) for water storage and tube bundle 151. In the exemplary embodiment, tube bundle 151 includes a plurality of tubes that channels cooling water from a source (not shown in FIG. 1) that may include a cooling tower, a lake or a river. Steam exhausted from turbine 138 flows over the external surfaces of tube bundle 151 wherein thermal energy is transferred from the steam to the cooling water via tube bundle walls. Thermal energy removal from the steam induces a change in state of the fluid to a liquid form. The liquid collects within condenser 150 from where it is channeled to pump 154 via suction header 152. In the exemplary embodiment, pump 154 is a feedwater pump. Alternatively, pump 154 may be a series of condensate booster pumps, condensate pumps and feedwater pumps. Also, alternatively, at least one feedwater heater that preheats feedwater prior to entry into HRSG 124 may be included in system 100. Feedwater enters first tube bank 126 and thermal energy is transferred from the combustion gas stream that flows over tube bank 126 surfaces to the feedwater within tubes 126. Heated feedwater is channeled to tube banks 128 wherein thermal energy is transferred to the feedwater in a manner substantially similar to that associated with tubes 126 with the exception that the gas stream has a higher temperature in the vicinity of tubes 128. Feedwater, that by this point is a combination of water and steam, is channeled to steam drum 130 from tubes 128. In the exemplary embodiment, steam drum 130 includes a plurality of steam/water separation devices (not shown in FIG. 1) that remove water from the steam and water flow stream and return the water to drum 130. Steam, with substantially most of the water removed, is further channeled to superheater tube banks 132 wherein the exhaust gas stream from turbine 112 is at its highest temperatures and transfers thermal energy to the steam within tubes 132 in a manner similar to that for tubes 126 and 128. Superheated steam is channeled to steam header 134 upon exit from HRSG 124.

Electric current from CTG 116 is transmitted to transmission lines 166 via interconnection lines 119. Electric current is similarly transmitted to transmission lines 166 from STG 142 via interconnection 146. Transmission lines 166 connect grid 164 with system 100. Other electric power generation facilities 170 generate and transmit electric power into grid 164 for use by consumers 168.

Controller 162 includes a processor (not shown in FIG. 1), a memory (not shown in FIG. 1), a plurality of input channels (not shown in Figure 1), and a plurality of output channels (not shown in FIG. 1) and may include a computer (not shown in FIG. 1). As used herein, the term computer is not limited to just those integrated circuits referred to in the art as a computer, but broadly refers to a processor, a microcontroller, a microcomputer, a programmable logic controller, an application specific integrated circuit, and other programmable circuits, and these terms are used interchangeably herein. In the exemplary embodiment, memory may include, but is not limited to, a computer-readable medium, such as a random access memory. Alternatively, a floppy disk, a compact disc-read only memory (CD-ROM), a magneto-optical disk (MOD), and/or a digital versatile disc (DVD) may also be used. Also, in the exemplary embodiment, a plurality of input channels may represent, but not be limited to, computer peripherals associated with an operator interface such as a mouse and a keyboard. Alternatively, other computer peripherals may also be used, for example, a scanner. Furthermore, in the exemplary embodiment, a plurality of output channels may include, but not be limited to, an operator interface monitor.

Controller 162 receives a plurality of inputs from a plurality of sensors, some of which include sensors 120 and 144, processes the inputs, generates appropriate outputs based on programmed algorithms and discrete circumstances, and transmits signals to the appropriate system 100 components to bias those components. For example, in the event of a small downward frequency transient on grid 164, i.e., approximately 0.5 Hz or less, controller 162 will receive a frequency input transmitted from sensors 120. Controller 162 subsequently induces an opening bias for inlet guide vane 102 and fuel valve 110. Inlet guide vane 102 is modulated throughout the transient such that predetermined margins to potential compressor surge conditions are maintained. Combustion within combustor 106 increases and induces a similar increase in gas stream mass flow rate and gas stream temperature. The change in gas stream temperature is maintained within a range of predetermined temperature and temperature gradient parameters to mitigate potential stresses in turbine 112 components. Turbine 112 accelerates and the rotational acceleration is induced in generator 116 via shaft 114, thereby inducing a partial increase in grid 164 frequency towards the nominal system frequency value, for example, 50 Hz for Europe and 60 Hz for North America. Similarly, for a sensed increase in grid frequency of approximately 0.5 Hz or less, controller 162 receives a frequency input from sensors 120 and induces a closing bias to air guide vane 102 and fuel valve 110 to decrease mass flow rate and temperature of the gas stream generated by combustor 106. The subsequent induced deceleration of shaft 114 via turbine 112 also decelerates CTG 116 and a grid 164 frequency decrease towards the nominal value of frequency is induced.

A similar process may be observed for STG 142. Sensors 144 sense a decrease in grid 164 frequency and transmit an associated signal to controller 162. Controller 162 induces an opening bias to steam valve 136. Valve 136 is opened at a rate consistent with maintaining steam header 134 pressure upstream and downstream of valve 136 within a range of predetermined parameters. Also, appropriate control of HRSG 124 is maintained such that any subsequent changes in steam temperature are maintained within a range of predetermined temperature and temperature gradient parameters to mitigate potential stresses in turbine 138 components.

Figure 2:
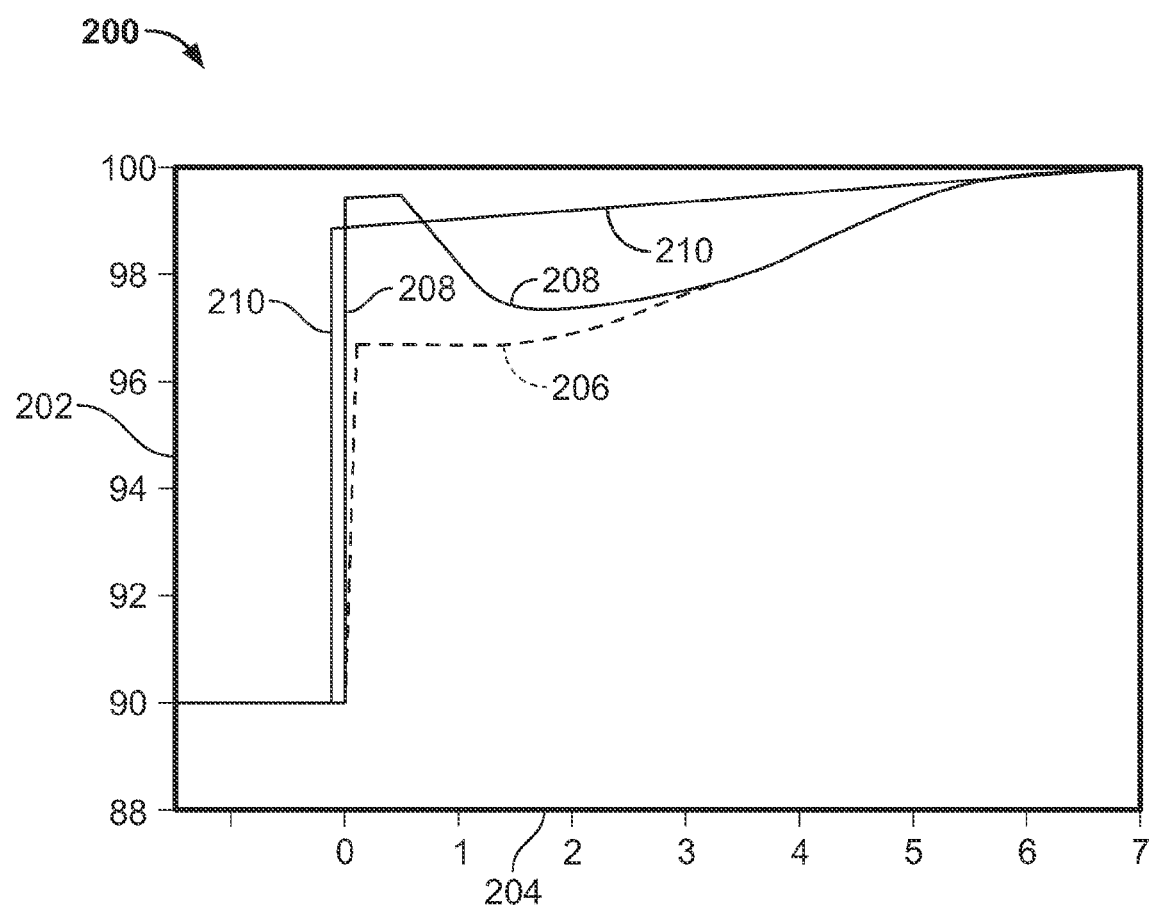
FIG. 2 is a simplified schematic diagram of the steam turbine-generator shown in FIG. 1.

FIG. 2 is a graphical illustration 200 of an exemplary response of combined-cycle power system 100 (shown in FIG. 1) to an electric power grid 164 under-frequency condition. Response graph 200 includes ordinate 202 (y-axis) in increments of 2% representing approximate electric power outputs of CTG 116 and STG 142 as a function of time. Ordinate 202 includes a value of 88% at the origin of graph 200 and 100% as the uppermost limit, corresponding to CTG 116 and STG 142 MCR. Graph 200 also includes abscissa (x-axis) 204 that illustrates time in minutes using one minute increments. Time=0 indicates the initiation of an under-frequency transient on electric power grid 164. Time=7 minutes illustrates the transient and system 100 response being substantially complete. Curve 206 illustrates a potential CTG 116 output response versus time. Curve 208 illustrates a potential STG 142 output response versus time without the invention described herein for comparison purposes. Curve 210 illustrates a potential STG 142 output response versus time with the invention described herein.

Figure 3:
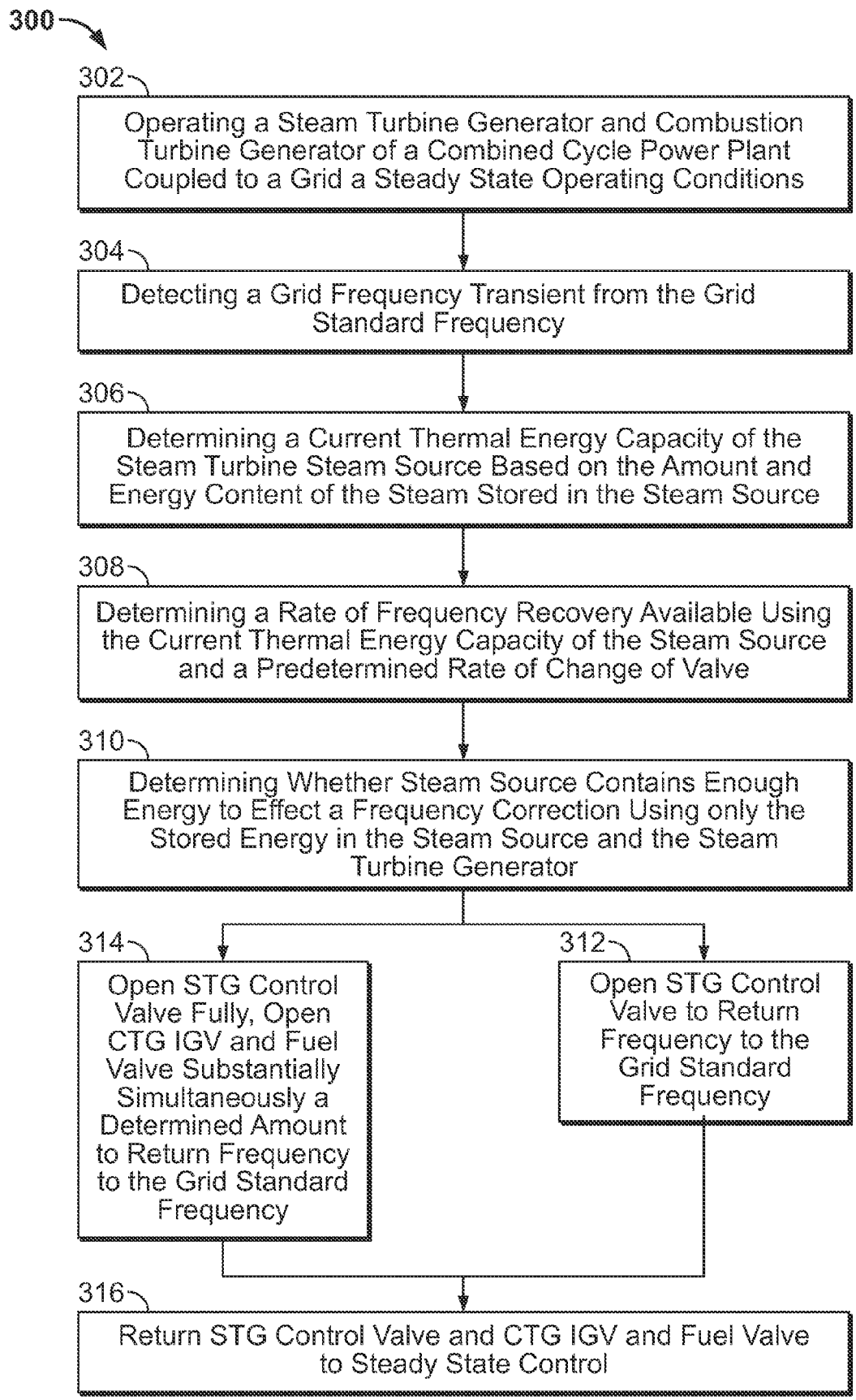
FIG. 3 is a flow chart of an exemplary method of controlling an output of a turbine controller that may be used with the turbine shown in FIG. 2.

FIG. 3 is a flow chart of an exemplary method 300 of a response to an electric power grid frequency transient condition of the combined-cycle power system 100 (shown in FIG.

1). Method 300 includes operating 302 STG 142 and CTG 116 at substantially steady-state conditions with STG 142 operating at MCR and CTG 116 operating at a partial load below MCR. Valve 136 is open enough to permit STG 142 to operate at MCR, vane 102 and valve 110 are in throttled positions such that system 100 may referred to as operating in a frequency-sensitive mode of electric power generation. Alternatively, system 100 may be operated in a nominal dispatch mode, wherein an electric power dispatching authority directs system 100 and other facilities 170 generation output.

In order to facilitate operating 302 STG 142 and CTG 116 at substantially steady-state conditions, valve 136, sensors 144, and controller 162 cooperate to operate system 100 in frequency-sensitive mode. Valve 136 is configured and positioned and cooperates with controller 162 such that valve 136 is open enough to permit STG 142 to operate at MCR. A plurality of valve 136 positions between the fully open and fully closed positions, in conjunction with a corresponding HRSG 124 backpressure for each position, facilitates generating a particular steam mass flow rate. HRSG 124 backpressure facilitates maintaining a reservoir of substantially immediately available power and maintaining a reservoir of substantially immediately available capacity to store thermal energy that may be used as described below. Controller 162 transmits signals that move valve 136 appropriately to generate power while maintaining the appropriate backpressure to respond to a power increase or decrease demand. Controller 162 moves valve 136 as a function of existing power demand, existing steam flow rate, existing grid frequency, and existing HRSG backpressure. The cooperation of valve 136, controller 162 and sensors 144 are described further below. It is noted that the aforementioned cooperation permits system 100 to operate at output levels that facilitate relatively high efficiency generation.

System 100 senses 304 a frequency transient condition on grid 164 via sensors 120 and 144. This event corresponds to time=0 minutes in FIG. 2. The illustrated under-frequency condition may be a result of a trip of one or more generating units 170 or a large increase in electric power demand by consumers 168 such that a grid frequency decrease may be greater than 0.5 Hz below the standard frequency. An over-frequency condition may be caused by a large decrease in electric power demand by consumers. Controller 162 interprets the transient as a demand for a rapid electric power generation change from system 100.

Controller 162 determines 306 a current thermal energy capacity of HRSG 124 based on the amount and energy content of the steam stored in HRSG 124. During relatively small frequency transients, the thermal energy capacity of HRSG 124 is capable of releasing or storing sufficient energy to compensate for the energy needed to return the grid frequency to the standard frequency. During relatively larger frequency transients, the thermal energy capacity of HRSG 124 may not be capable of releasing or storing sufficient energy to compensate for the energy needed to return the grid frequency to the standard frequency. Controller 162 also determines 308 a rate of frequency recovery available using the current thermal energy capacity of the thermal energy reservoir and a predetermined rate of change of valve 136. If the determined rate of frequency recovery available is greater than the grid frequency deviation and a predetermined recovery period, controller 162 transmits a signal to steam turbine control valve 136 to induce a thermal energy transfer between the thermal energy reservoir and the steam turbine that facilitates returning the grid frequency to the standard frequency using only steam turbine control valve 136 in a predetermined amount of time.

If the determined rate of frequency recovery available is less than the grid frequency deviation and a predetermined recovery period, controller 162 transmits a signal to steam turbine control valve 136, inlet guide vane 102, and fuel valve 110 such that the power level of STG 142 and CTG 116 are rapidly changed substantially simultaneously to facilitate a predetermined rate of a grid frequency recovery for a predetermined period of time wherein the predetermined rate of frequency recovery is substantially uniform.

Curve 208 of response graph 200 illustrates a potential response of STG 142 to the aforementioned under-frequency transient without the invention discussed herein and is presented for comparison purposes. In this circumstance, valve 136 rapidly opens to the substantially fully open position. Steam flow to turbine 138 increases rapidly and electric power generation output of STG 142 increases accordingly to a value substantially similar to 100% of MCR. Electric power output remains steady at a value substantially similar to 100% of MCR, however, in less than one minute power output decreases as steam backpressure upstream of valve 136 in HRSG 124 decreases as the thermal energy reserve is depleted. Curve 206 of response graph 200 illustrates CTG 116 response. Controller 162 begins to move vane 102 and valve 110 towards substantially fully open positions. In the exemplary embodiment, inlet guide vane 102 is modulated throughout the transient such that predetermined margins to potential compressor surge conditions are maintained. The use of the thermal energy reserve within HRSG 124 facilitates vane 102 modulation and subsequently increasing the margin to potential surge conditions. Alternatively, methods for active compressor surge management may be integrated into the control scheme. Valve 110 responds more rapidly, thereby peak-firing turbine 112 with a fuel-rich mixture as the air flow from compressor 104 starts to increase. It is noted that the response of CTG 116 is slightly slower than STG 142 due to the finite period of time associated with valve 110 opening (for safety and control purposes) as well as the aforementioned compressor 104 speed decrease in proportion to the CTG 116 frequency decrease. These circumstances associated with CTG 116 are compared to the substantially immediately available additional steam flow capacity residing in HRSG 124 thermal reservoir.

CTG 116 is maintained at a steady output of approximately 96% to 98% of MCR as illustrated by curve 206 on response graph 200. The associated plateau illustrates that CTG 116 initial response is limited to less than 100% MCR since the peak-firing increases combustion gas stream temperature and the gas stream temperature gradient and must be controlled within a range of predetermined parameters to mitigate inducing thermal stresses in turbine 112 components that may have contact with the gas stream and to maintain a fuel-to-air ratio within appropriate guidelines. As increased air flow is induced due to vane 102 opening and CTG 116 accelerating, the mass flow rate through turbine 112 increases and fuel valve 110 is once again biased to open further to admit more fuel. As a result, CTG 116 output increases at a steady rate until substantially 100% of MCR is attained. It is noted that it takes approximately two minutes from system 100 sensing the under-frequency condition to attain the initiation of the steady increase in power output and between six and seven minutes to attain substantially 100% MCR.

As the temperature and the mass flow rate of combustion gas is channeled to HRSG 124 and the associated thermal energy transfer from the gas to the water/steam circuit within HRSG 124 increases, the decrease in STG 142 power output begins to be mitigated and curve 208 follows curve 206 within approximately three minutes of initiation of the transient.

STG 142 attains substantially 100% of MCR within seven minutes of initiation of the transient.

In one embodiment, a temperature set point to an inlet of steam turbine 138 is temporarily set to a temporary temperature excursion limit that is selected to facilitate the predetermined rate of the grid frequency recovery for a predetermined period of time. In another embodiment, a temperature set point to HRSG 124 temperature is temporarily set to a temporary temperature excursion limit that is selected to facilitate the predetermined rate of the grid frequency recovery for a predetermined period of time. Setting the temperature setpoints to temporary temperature excursion limits facilitates attaining the predetermined rate of the grid frequency recovery by permitting storage of more thermal energy in steam source 124 or by permitting release of greater amounts of energy from steam source 124.

In accordance with an exemplary embodiment of the present invention. Controller 162 determines 306 a current thermal energy capacity of steam source 124 and determines 308 a response time to mitigate the frequency transient using valve 136. If the determined response time is within a predetermined limit, controller 162 corrects 312 the frequency transient using the energy stored in steam source 124 through valve 136. If the determined response time is not within a predetermined limit or if the current thermal energy capacity of steam source 124 is insufficient to correct the frequency transient, controller 162 corrects 314 the frequency transient using the energy stored in steam source 124 through valve 136 and by increasing the power level output of CTG 116 substantially simultaneously. Using only STG 142 to correct frequency transients that are within the capability of the stored energy of steam source 124 facilitates reducing temperature and stress transients to CTG 116. When controller 162 determines that the magnitude of the frequency transient and/or the energy stored in steam source 124 prevents STG 142 from being able to correct the frequency transient, controller 162 determines a relative contribution of STG 142 and CTG 116 that will facilitate correcting the frequency transient and rapidly ramps valve 136 and valve 110 and IGV 102 to approximate positions that will correct the frequency transient within a predetermined time period.

The methods and apparatus for an electric power grid frequency control sub-system described herein facilitate operation of a combined-cycle power system. More specifically, designing, installing and operating an electric power grid frequency control sub-system as described above facilitates operation of a combined-cycle power system by using thermal energy storage capacities to facilitate maintaining a standardized electric power grid frequency during under-frequency transients on a connected electric power grid. Furthermore, over-frequency transients on the connected electric power grid may also be mitigated with the electric power grid frequency control sub-system. As a result, maintenance of a stable electric power grid frequency may be facilitated and extended maintenance costs and combined-cycle power system outages may be reduced or eliminated.

Although the methods and apparatus described and/or illustrated herein are described and/or illustrated with respect to methods and apparatus for a combined-cycle power system, and more specifically, a electric power grid frequency control sub-system, practice of the methods described and/or illustrated herein is not limited to electric power grid frequency control sub-systems nor to combined-cycle power systems generally. Rather, the methods described and/or illustrated herein are applicable to designing, installing and operating any system.

Exemplary embodiments of electric power grid frequency control sub-systems as associated with combined-cycle power systems are described above in detail. The methods, apparatus and systems are not limited to the specific embodiments described herein nor to the specific electric power grid frequency control sub-system designed, installed and operated, but rather, the methods of designing, installing and operating electric power grid frequency control sub-systems may be utilized independently and separately from other methods, apparatus and systems described herein or to designing, installing and operating components not described herein. For example, other components can also be designed, installed and operated using the methods described herein.

As used herein, with reference to a real-time controller, real-time refers to outcomes occurring at a substantially short period after a change in the inputs affecting the outcome. The period is the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome.

As used herein, the term controller may include any processor-based or microprocessor-based system, such as a computer system, that includes microcontrollers, reduced instruction set circuits (RISC), application-specific integrated circuits (ASICs), logic circuits, and any other circuit or processor that is capable of executing the functions described herein. The examples given above are exemplary only, and are not intended to limit in any way the definition and/or meaning of the term controller.

The various embodiments, or the components thereof, may be implemented as a part of the computer system. The computer system may include a computer, an input device, a display unit, and an interface, for example, to access the Internet. It may also include a microprocessor, which may be connected to a communication bus. The computer may include a memory, which may include a Random Access Memory (RAM) and a Read Only Memory (ROM), as well as a storage device, which may be a hard disk drive or a removable storage drive such as a floppy disk drive, an optical disk drive, and so forth. The storage device can also be other similar means of loading computer programs or other instructions into the computer system.

The computer system executes a set of instructions that are stored in one or more storage elements, in order to process input data. The storage elements may also hold data or other information, as desired or required, and may be in the form of an information source or a physical memory element in the processing machine. The set of instructions may include various commands that instruct the computer system to perform specific operations, such as the processes of the various embodiments of the invention. The set of instructions may be in the form of a software program. The software may be in various forms, such as system software or application software. Further, the software may be in the form of a collection of separate programs, a program module within a larger program, or a portion of a program module. The software may also include modular programming in the form of object-oriented programming. The processing of input data by the processing machine may be in response to user commands, to results of previous processing, or to a request made by another processing machine.

As used herein, the terms 'software' and 'firmware' are interchangeable and include any computer program that is stored in the memory, to be executed by a computer, which includes RAM memory, ROM memory, EPROM memory, EEPROM memory, and non-volatile RAM (NVRAM) memory. The memory types mentioned above are only exemplary and do not limit the types of memory used to store computer programs.

The above-described model predictive control method is cost-effective and highly reliable. The method permits outputting a machine loading profile that quickly reaches a hold point that is determined to be the highest possible, followed by a controlled ramp and an early release to full load. Accordingly, the model predictive control method facilitates operation of machines in a cost-effective and reliable manner.

While the invention has been described in terms of various specific embodiments, those skilled in the art will recognize that the invention can be practiced with modification within the spirit and scope of the claims.

What is claimed is:

1. A method of operating a combined-cycle power system coupled to an electric power grid, the combined-cycle system including at least one electric power generator, a steam turbine coupled to the at least one electric power generator, a combustion turbine coupled to the at least one electric power generator, and a steam source having a thermal energy reservoir, the thermal energy reservoir being in flow communication with the steam turbine via at least one control valve, said method comprising:

operating the steam turbine at a first electric power output, operating the combustion turbine at a first electric power output, and operating the steam source at a first thermal energy level, the steam turbine having at least one control valve in a first position, the combustion turbine having at least one air inlet guide vane in a first position, the steam turbine and the combustion turbine being synchronized to an operating frequency of the grid, so that the steam turbine, the combustion turbine, and the grid are operating at a frequency substantially similar to a standardized grid frequency value; and upon sensing a grid frequency deviation away from the standardized grid frequency value, then:

determining a current thermal energy capacity of the thermal energy reservoir;

determining a rate of frequency recovery available using the current thermal energy capacity of the thermal energy reservoir and a predetermined rate of change of the at least one steam turbine control valve;

if the determined rate of frequency recovery available is greater than the grid frequency deviation and a predetermined recovery period then, moving the at least one steam turbine control valve to a second position thereby inducing a thermal energy transfer between the thermal energy reservoir and the steam turbine, moving the thermal energy reservoir energy level to a second energy level, thereby facilitating a predetermined rate of a grid frequency recovery for a predetermined period of time, the predetermined rate of frequency recovery being substantially uniform; and if the determined rate of frequency recovery available is less than the grid frequency deviation and a predetermined recovery period then, substantially simultaneously moving the at least one combustion turbine air inlet guide vane to a second position and the at least one steam turbine control valve to a second position thereby changing a power level output of the combustion turbine, inducing a thermal energy transfer between the thermal energy reservoir and the steam turbine, moving the thermal energy reservoir energy level to the second energy level, and changing the power output level of the combustion turbine, thereby facilitating a predetermined rate of a grid frequency recovery for a predetermined period of time, the predetermined rate of frequency recovery being substantially uniform.

2. A method in accordance with claim 1 wherein moving the at least one steam turbine control valve to a second position comprises increasing a steam mass flow rate to the steam turbine.

3. A method in accordance with claim 1 wherein moving the at least one steam turbine control valve to a second position comprises decreasing a steam mass flow rate to the steam turbine.

4. A method in accordance with claim 1 wherein moving the at least one combustion turbine inlet guide vane to a second position comprises increasing a combustion gas mass flow rate to the combustion turbine.

5. A method in accordance with claim 1 wherein moving the at least one combustion turbine inlet guide vane to a second position comprises decreasing a combustion gas mass flow rate to the combustion turbine.

6. A method in accordance with claim 1 wherein moving the thermal energy reservoir energy level to a second energy level comprises decreasing and subsequently increasing a steam pressure within the steam source.

7. A method in accordance with claim 1 further comprising adjusting a steam turbine inlet temperature set point to a temporary temperature excursion limit selected to facilitate the predetermined rate of the grid frequency recovery for a predetermined period of time, the predetermined rate of frequency recovery being substantially uniform.

8. A method in accordance with claim 1 further comprising adjusting a heat recovery steam generator temperature set point to a temporary temperature excursion limit selected to facilitate the predetermined rate of the grid frequency recovery for a predetermined period of time, the predetermined rate of frequency recovery being substantially uniform.

9. An electric power grid frequency control sub-system for a combined-cycle power system, said control sub-system comprises:

a steam turbine comprising a steam flow control valve;

a steam source coupled in flow communication with said steam turbine through said control valve, said steam source comprising a thermal energy reservoir;

a combustion turbine comprising an inlet guide vane;

an electric power generator coupled to at least one of said steam turbine and said combustion turbine, said electric power generator electrically coupled to an electric power grid, a frequency of said generator and the grid being synchronized at an operating frequency of the grid;

a controller configured to modulate said steam flow control valve and said inlet guide vane substantially simultaneously to facilitate inducing a predetermined rate of a grid frequency recovery for a predetermined period of time wherein the predetermined rate of frequency recovery is substantially uniform.

10. An electric power grid frequency control sub-system in accordance with claim 9 configured to open said steam control valve in response to a grid under-frequency condition and close said steam control valve in response to a grid over-frequency condition.

11. An electric power grid frequency control sub-system in accordance with claim 9 wherein said controller is configured to determine a current thermal energy capacity of the thermal energy reservoir.

12. An electric power grid frequency control sub-system in accordance with claim 9 wherein said controller is configured to determine a rate of frequency recovery available using the current thermal energy capacity of the thermal energy reservoir and a predetermined rate of change of the at least one steam turbine control valve.

13. An electric power grid frequency control sub-system in accordance with claim 9 wherein said controller is configured to open said guide vane in response to a grid under-frequency condition and close said guide vane in response to a grid over-frequency condition.

14. A combined-cycle power system comprising:
   a steam turbine comprising a steam flow control valve, said steam turbine coupled to at least one electric generator;
   a steam source comprising a thermal energy reservoir, said steam source in flow communication with said steam turbine through said steam flow control valve;
   a combustion turbine coupled to the at least one electric generator said combustion turbine comprising an inlet guide vane; and
   a controller communicatively coupled to said steam flow control valve, said steam source, and said inlet guide vane, said controller configured to:
      determine a current thermal energy capacity of the thermal energy reservoir;
      determine a rate of frequency recovery available using the current thermal energy capacity of the thermal energy reservoir and a predetermined rate of change of the steam turbine control valve;
      open the inlet guide vane substantially simultaneously with said steam flow control valve in response to a grid under-frequency condition that exceeds the frequency recovery available of the thermal energy reservoir; and
      close the inlet guide vane substantially simultaneously with said steam flow control valve in response to a grid over-frequency condition that exceeds the frequency recovery available of the thermal energy reservoir.

15. A combined-cycle power system in accordance with claim 14 wherein said steam source comprises a heat recovery steam generator.

16. A combined-cycle power system in accordance with claim 14 wherein said steam turbine, said combustion turbine, and said generator are rotatably coupled together on a common rotatable shaft such that said control valve, said air inlet guide vane, and said controller cooperate to move said control valve and said guide vane toward a substantially open position to accelerate said common rotatable shaft in response to a grid under-frequency condition and toward a substantially closed position to decelerate said common rotatable shaft in response to a grid over-frequency condition.

17. A combined-cycle power system in accordance with claim 14 wherein at least one generator comprises a first generator, said first generator being rotatably coupled to said steam turbine such that said steam turbine control valve facilitates an acceleration and a deceleration of said first generator.

18. A combined-cycle power system in accordance with claim 14 wherein at least one generator further comprises a second generator, said second generator being rotatably coupled to said combustion turbine such that said combustion turbine air inlet guide vane facilitates an acceleration and a deceleration of said second generator.

19. A combined-cycle power system in accordance with claim 14 wherein if the determined rate of frequency recovery available is greater than the grid frequency deviation and a predetermined recovery period then, moving the at least one steam turbine control valve to a second position thereby inducing a thermal energy transfer between the thermal energy reservoir and the steam turbine, moving the thermal energy reservoir energy level to a second energy level, thereby facilitating a predetermined rate of a grid frequency recovery for a predetermined period of time, the predetermined rate of frequency recovery being substantially uniform.

20. A combined-cycle power system in accordance with claim 14 wherein if the determined rate of frequency recovery available is less than the grid frequency deviation and a predetermined recovery period then, substantially simultaneously moving the combustion turbine air inlet guide vane to a second position and the steam turbine control valve to a second position such that a power level of each of the CTG and the STG are ramped substantially simultaneously to a power level determined to facilitate a predetermined rate of a grid frequency recovery for a predetermined period of time, the predetermined rate of frequency recovery being substantially uniform.

* * * * *